United States Patent [19]

Kish

[11] 4,114,656

[45] Sep. 19, 1978

[54] HOSE ASSEMBLY

[75] Inventor: Arthur S. Kish, Lyndhurst, Ohio

[73] Assignee: Murray Corporation, Cockeysville, Md.

[21] Appl. No.: 808,123

[22] Filed: Jun. 20, 1977

[51] Int. Cl.² ............................................. F16L 13/14
[52] U.S. Cl. ....................................... 138/109; 285/256
[58] Field of Search ................ 138/109, 103; 285/174, 285/256, 242, 321

[56] References Cited

U.S. PATENT DOCUMENTS

| | | | |
|---|---|---|---|
| 2,570,477 | 10/1951 | Paquin | 285/174 |
| 3,314,696 | 4/1967 | Ferguson et al. | 285/174 |
| 3,408,092 | 10/1968 | Appleton | 285/174 |
| 3,530,900 | 9/1970 | Kish | 285/174 |
| 3,858,914 | 1/1975 | Karie et al. | 285/174 |

*Primary Examiner*—Richard E. Aegerter
*Assistant Examiner*—L. Footland
*Attorney, Agent, or Firm*—Isler and Ornstein

[57] ABSTRACT

The invention is concerned with the provision of a hose assembly in which the hose is clamped between a tube or nipple and a shell, and the shell is provided with a body portion which is crimped to the hose. The shell is entirely independent of and unattached to the tube or nipple, thereby facilitating removal of the shell from the assembly in a situation where the hose has burst or become damaged, and a new hose must be used to replace it in the assembly. The shell is provided with an inturned flange which functions as a stop for the end of the hose, and the tube or nipple is provided with an annular bead, one side of which functions as a stop to predetermine the position of the tube or nipple relatively to the end of the hose.

1 Claim, 5 Drawing Figures

HOSE ASSEMBLY

This invention relates generally to hose assemblies or connections, which may be used generally in hydraulic systems, such as automotive air conditioning systems, power steering and braking systems, and other industrial applications.

In my U.S. Pat. No. 3,530,900, a hose assembly is disclosed, consisting of a hose of rubber or like material, a metallic tube or nipple which extends into one end of the hose, and a metallic shell, which is crimped to the outer surface of the hose, and serves to clamp the hose to the tube or nipple.

The tube or nipple is provided with axially-spaced circumferential ridges which are designed to become embedded in the inner wall of the hose, to thereby provide not only a good frictional contact or interlock between the hose and tube, but also to provide a tight seal against passage of refrigerant between the hose and tube.

The shell is copper-brazed at one end to the nipple, and thus, in effect, is integrated with the nipple.

In actual practice, it has been found that the foregoing construction has certain disadvantages.

In the first place, should the hose burst or break in the area of the assembly, the fact that the shell is brazed to the tube or nipple, and the shell is crimped to the hose, makes it virtually impossible to remove the hose from the assembly and replace it with a new hose, in the assembly. This is rendered even more difficult by the fact that the ridges on the tube or nipple are embedded in the inner wall of the hose.

The replacement of the hose, under such circumstances, becomes even more difficult, in an emergency where a new assembly is not available, or is not carried in stock by a dealer or garage.

It may be further pointed out that in the hose assembly of the aforesaid patent, the depth of the ridges on the tube or nipple, as stated in the patent, varies from 0.008 to 0.016 inch, depending on the dimensions of the nipple. This depth has been found to be so small as not to provide a sufficiently strong interlock between the hose and nipple, or to provide a completely leak-proof seal therebetween.

The present invention has, as its primary object, the provision of a hose assembly of the character described, which is of such construction, as to enable a car owner or driver, in a situation where the hose has burst or otherwise become damaged, to make a replacement of the hose possible with the aid of a simple tool and clamping device, or to have such a replacement made in virtually any gas station, garage, or auto shop.

Another object of the invention is to provide a hose assembly of the character described, wherein the shell of the assembly is independent of or entirely free of any connection with the tube or nipple of the assembly.

A further object of the invention is to provide a hose assembly of the character described, wherein the tube or nipple is provided with axially-spaced circumferential ridges of such contour and depth as to form an extremely strong interlock with the hose and an extremely efficient leak-proof joint between the tube or nipple and the hose.

Other objects and advantages of my invention will be apparent during the course of the following description.

In the accompanying drawings forming a part of this specification, and in which like numerals are employed to designate like parts throughout the same, FIG. 1 is a fragmentary plan view showing the components of the hose assembly in assembled relation, prior to the operation of clamping or crimping the shell to the hose and the hose to the nipple;

Figure 1:
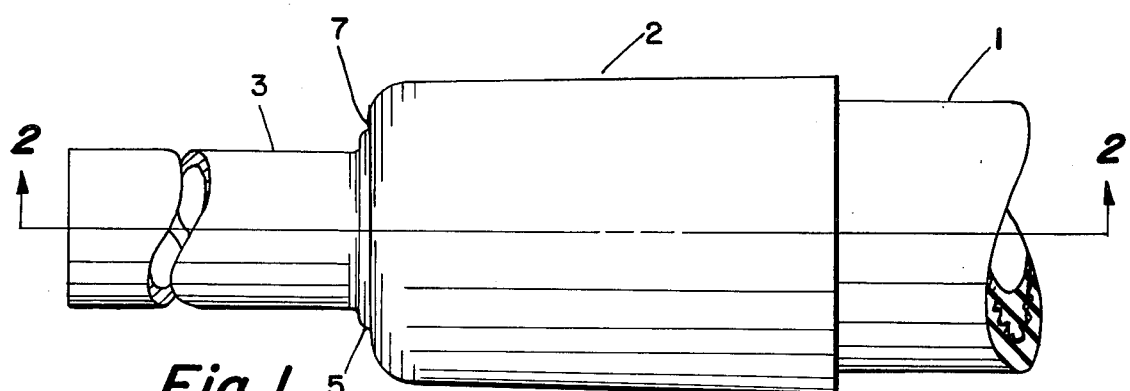
Figure 2:
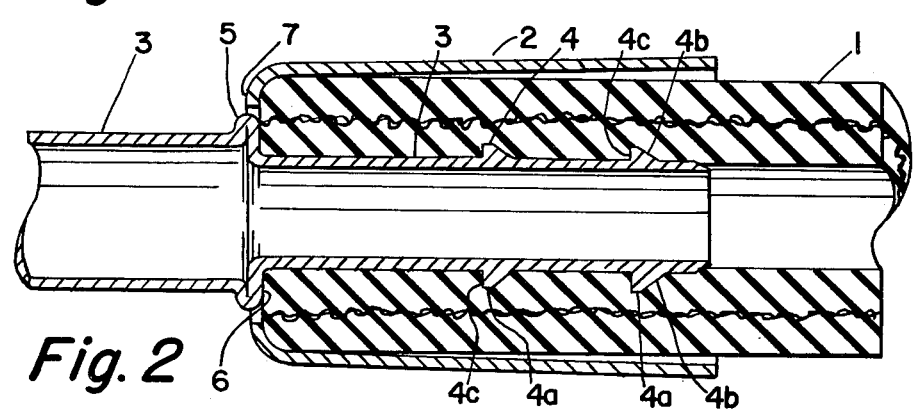
FIG. 2 is a cross-sectional view, taken on the line 2—2 of FIG. 1.

Referring more particularly to FIGS. 1 and 2 of the drawings, there is disclosed a hose assembly for use in automotive air conditioning systems, the assembly consisting of a hose 1, a shell 2, and a tube or nipple 3.

The hose is a standard type of hose, made, for example, of seamless oil-resistant synthetic rubber designed for minimum penetration through the walls thereof of refrigerants of the type used in automotive air conditioning systems, and usually reinforced with plies of braided yarn bonded to the rubber.

The tube or nipple 3 is made of welded steel, aluminum, and/or brass tubing and extends partially into one end of the hose 1. To facilitate entry of the nipple into the hose with a minimum of effort, the outer or external diameter of the nipple is only slightly larger than the internal diameter of the hose, as best seen in FIG. 2. Also, as best seen in FIG. 2, the entry of the hose into the shell is facilitated by making the body portion of the shell 2 slightly bell-mouthed.

The portion of the tube or nipple 3 which extends into the hose is provided with a series of axially-spaced circumferential or annular ridges, ribs or barbs 4. These ridges, ribs or barbs 4 are of substantial depth or height, project from the outer surface of the tube, and serve a purpose to be presently described.

Each of the ridges, ribs or barbs 4 has a surface 4a, which is concentric with the outer surface of the tube 3, a conical surface 4b, which extends from one end of the surface 4a to the outer surface of the tube, and is disposed at that side of each of the ribs 4 which is closest to that end of the tube which projects into the hose 1, and an annular flat surface 4c, which is substantially perpendicular to the axis of the tube and extends from the other end of the surface 4b to the outer surface of the tube.

For the purpose of limiting the extent of entry of the tube or nipple 3 into the hose 1, as well as to provide a means for properly locating the ribs 4 axially in relation to the hose, the tube or nipple 3 is upset or formed to provide a bead 5, which provides a shoulder 6 for the purpose stated.

The shell 2 is made from a thin-walled tube of deep drawing steel, aluminum, and/or brass of uniform wall thickness, which is swaged at one end to provide a flange 7, which functions as a stop or shoulder for the end of the hose 1.

It may be noted, at this point, that the flange 7, for reasons to be presently explained, does not extend to the surface of the tube or nipple 3, and is not brazed to the tube or nipple, so that the shell is independent of and entirely free of attachment to the tube or nipple. This is in contradistinction to the flange 9 of the shell 2 in my aforesaid U.S. Pat. No. 3,530,900, which is copper-brazed to the tube or nipple 3 by means of a cylindrical portion 10 of the shell.

The shell 2 is characterized by the fact that the inner wall of the body thereof is relatively smooth and free from grooves or protuberances which would interfere with the introduction of the end of the hose 1 into the space between this inner wall and the tube or nipple 3, as shown in FIG. 2.

Figure 3:
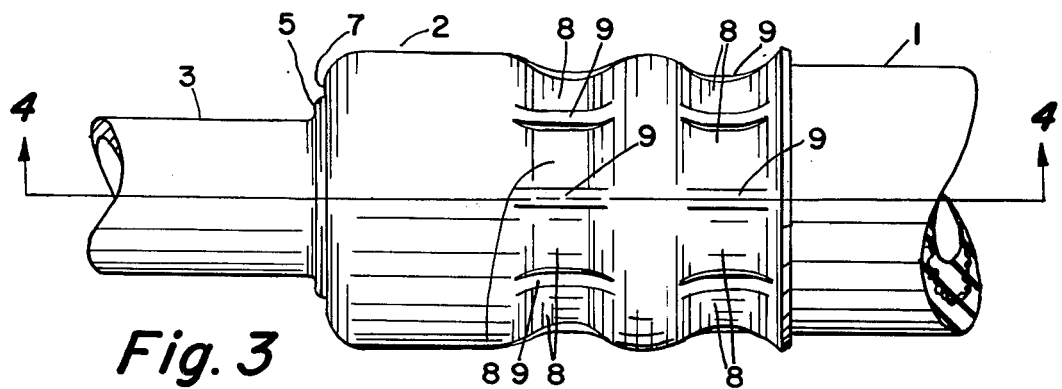
FIG. 3 is a view similar to FIG. 1, but showing the completed assembly, that is, the shell clamped or crimped to the hose, and the hose clamped to the nipple.
Figure 4:
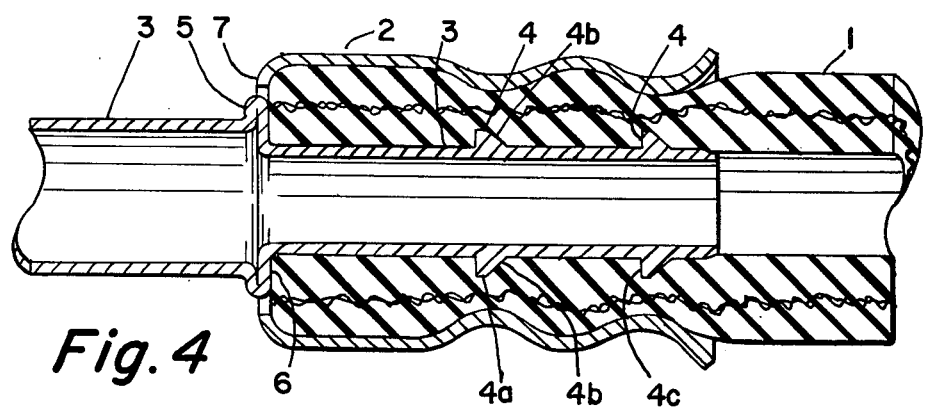
FIG. 4 is a cross-sectional view, taken on the line 4—4 of FIG. 3.
Figure 5:
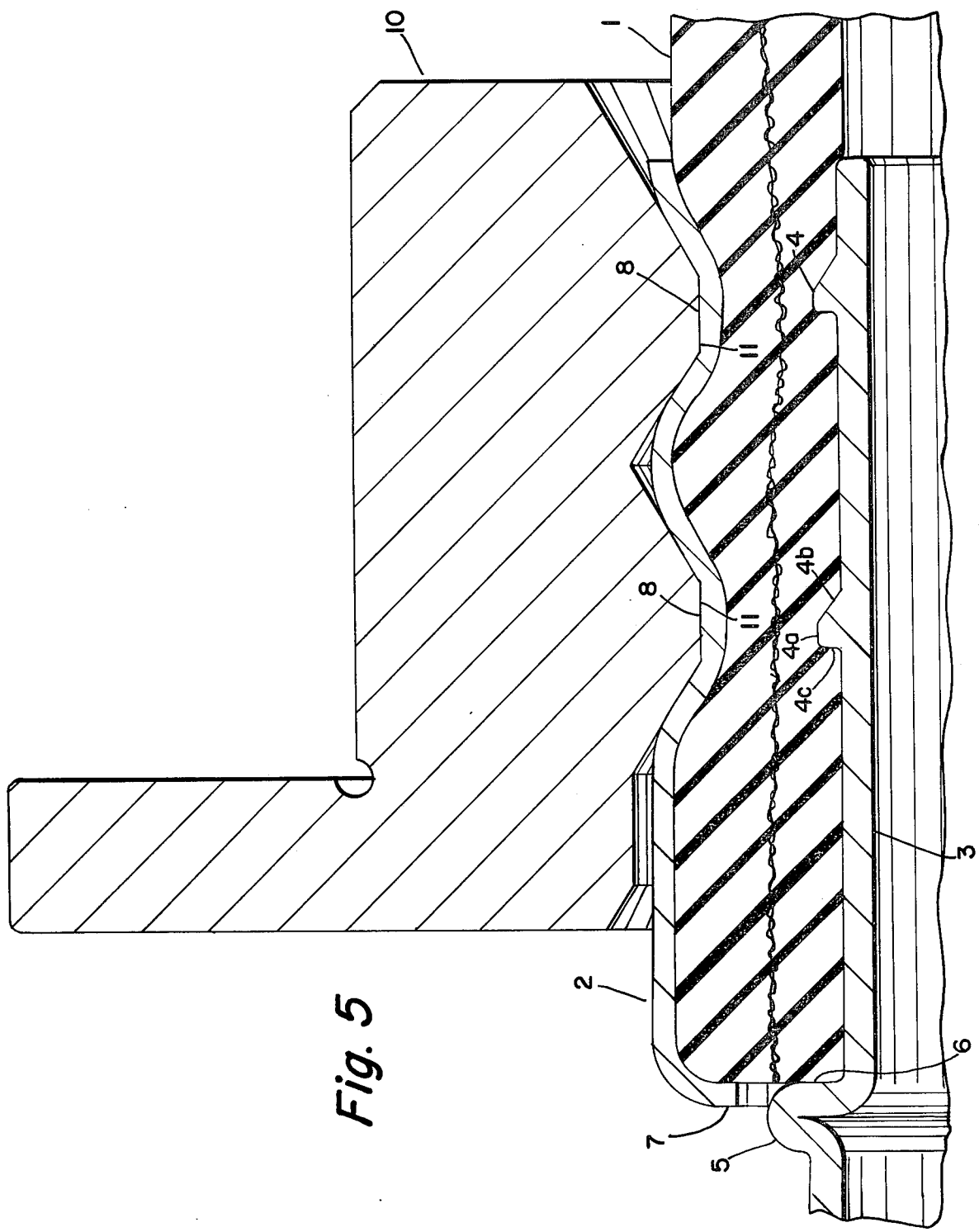
FIG. 5 is a view of a portion of FIG. 4, but on a greatly enlarged scale, and showing one of the crimping dies.

With the parts of the assembly assembled, as shown in FIGS. 1 and 2, the assembly is then subjected to a crimping operation, as a result of which a finished assembly is provided, as shown in FIGS. 3, 4 and 5.

This crimping operation is performed by means of apparatus similar to that shown in FIGS. 8, 9, 10, 11, 12, 13 and 14 of my aforesaid U.S. Pat. No. 3,530,900, and consists in the formation of circumferentially-spaced crimps 8 in the body of the shell 2, these crimps being separated by webs 9. The crimping is performed by means of crimping jaws 10 (FIG. 5), having arcuate crimping elements 11, these jaws and crimping elements being similar to the jaws 57 and crimping elements 58 in my aforesaid patent.

This crimping operation provides a firm frictional grip or interlock between the hose 1 and shell 2. At the same time, the crimping operation causes the ridges 6 of the tube or nipple 3 to become embedded in the inner wall of the hose, and thereby provide not only a good frictional contact or interlock between the hose and tube, but also provides a tight seal against passage of refrigerant between the hose and tube.

Due to the fact that the shell 2 is independent of an entirely free of attachment to the tube or nipple, a number of advantages are provided.

In the event that the car owner is in a situation where the hose 1 has burst or otherwise become damaged, replacement of the hose is made possible by means of a simple tool, such as a hacksaw or sharp chisel, which is available in virtually any gas station, garage, or auto shop.

By means of such a tool, the shell 2 may be cut by means of a cut which extends longitudinally through the shell and flange 7, thus splitting the shell at one point in its circumference.

The split shell may then be easily opened or spread, and removed from the hose 1.

After such removal of the shell, the burst or damaged hose is exposed, and can be easily removed or pulled off the hose or nipple 3, even though the ridges or ribs 4 are embedded in the inner wall of the hose.

Following such removal of the hose from the tube or nipple, a new hose can be slipped over the end of the tube or nipple, and can be clamped to the nipple by means of a clamp similar to the clamp 2 in my U.S. Pat. No. 3,526,416, which clamp is of a simple, readily available type, which can be purchased in virtually any gas station, garage, or auto shop, and thus carried in the car for replacement purposes.

As previously stated, the shoulder 6 of the bead 5 provides a means for limiting the extent of entry of the nipple 3 into the hose 1, as well as to provide a means for properly locating the ribs 4 axially in relation to the hose.

In other words, when the nipple is inserted into the end of the hose, the shoulder 6 of the bead 5 comes into contact with the end of the hose, so that the nipple is properly located axially in relation to the hose. At the same time, when the shell 2 is slipped over the end portion of the hose, the flange 7 comes into abutment with the end of the hose. This positions the annular ridges, ribs or barbs 4 properly in relation to the crimping elements 11, and the crimping elements to be located in the proper position over the barbs, so that absolute control of the crimping diameter will be achieved.

It is thus seen that I have provided a hose assembly which fulfills all of the stated objects of the invention.

It is to be understood that the form of my invention herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. A hose assembly comprising a metallic tube or nipple having an annular radially outwardly extending bead spaced from one end of the nipple and providing a shoulder or stop disposed in a plane perpendicular to the axis of the tube or nipple, a non-metallic hose frictionally secured to said tube nipple and having an end in abutment with said shoulder or stop, whereby to preposition said hose in predetermined axial relationship with said tube or nipple, and a metallic shell having a generally cylindrical body secured to said hose and having an inturned flange at one end engaging said end of said hose; and wherein said bead and said inturned flange are substantially co-planar; and wherein said tube or nipple is provided at axially spaced points with barbs extending outwardly from the outer surface of the tube or nipple and into the inner wall of said hose, and the body of said shell is provided at points spaced axially to correspond substantially with the spacing of said barbs with crimps extending into the outer wall of said hose, whereby said barbs and crimps are disposed in substantially the same diametric planes; and wherein said crimps are separated by circumferentially spaced webs; and wherein each barb has a surface which is concentric with the outer surface of the tube or nipple, a conical surface which extends from one end of said first-named surface to the outer surface of the tube or nipple and is disposed at that side of the rib which is remote from said stop or shoulder, and an annular flat surface which is substantially perpendicular to the axis of the tube and extends from the other end of said first-named surface to the outer surface of the tube.

* * * * *